Aug. 9, 1966    M. W. ST. CLAIR    3,264,760
QUIZ ANSWER SHEET WITH CORRECT ANSWER AND ITEM ANALYSIS INDICIA
Filed Aug. 16, 1965
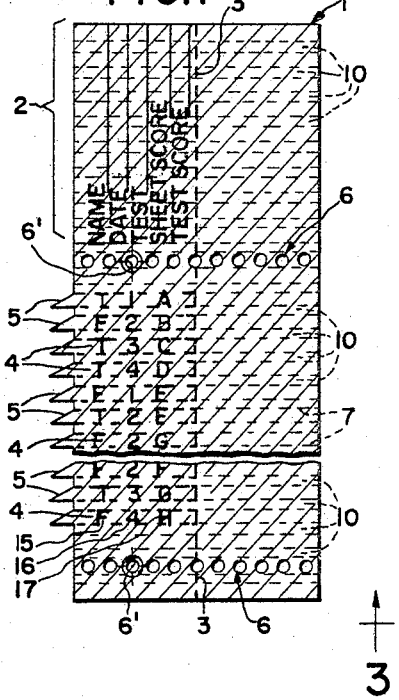
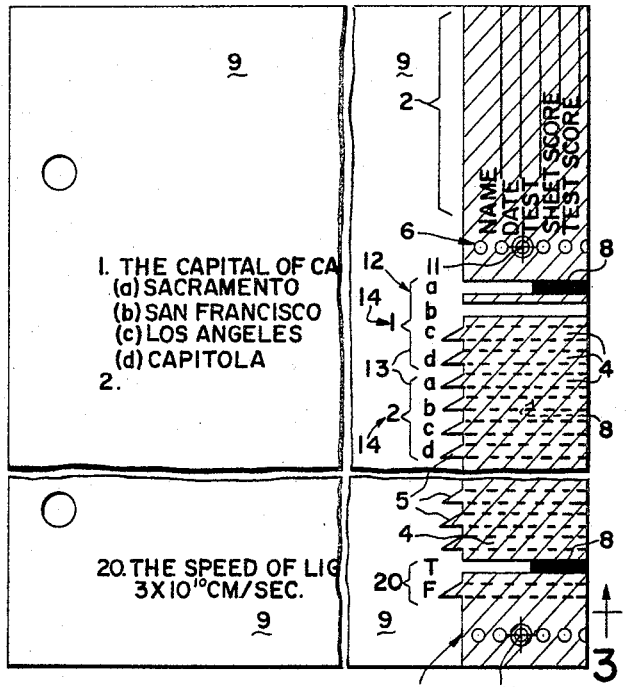
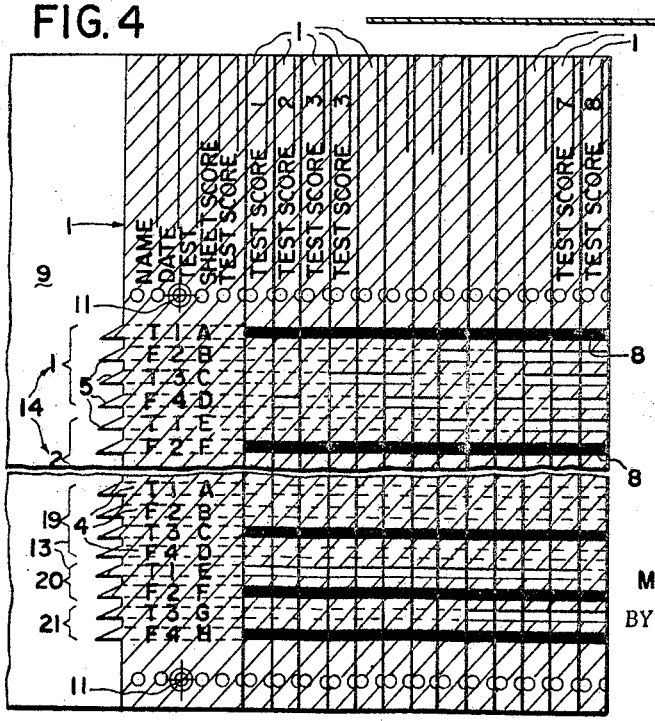
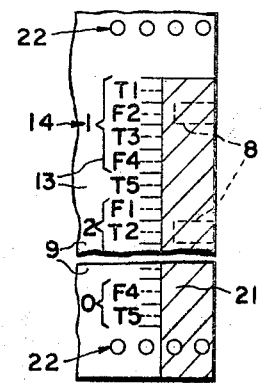
INVENTOR.
MAURICE W. ST. CLAIR
BY Harry E. Aine
ATTORNEY

United States Patent Office 3,264,760
Patented August 9, 1966

3,264,760
QUIZ ANSWER SHEET WITH CORRECT ANSWER
AND ITEM ANALYSIS INDICIA
Maurice Webster St. Clair, 1021 Sierra Drive,
Menlo Park, Calif.
Filed Aug. 16, 1965, Ser. No. 479,879
8 Claims. (Cl. 35—48)

The present invention relates in general to answer sheets and more particularly to an improved answer sheet which records all the answers selected by the examinee, automatically indicating to the examinee when he has selected the correct answer and further permitting the examiner to fan the edges of the marked and returned answer sheets to obtain without further effort an item analysis of the examination. An item analysis is a display showing which questions were easiest or hardest, and whether certain questions consistently evoked the same incorrect answer, etc.

It is generally recognized that an optimized testing device would be simple and inexpensive and achieve at least the following objectives: (1) It would provide the examinee with the correct answer to the questions such that he could learn the correct answer from the quiz; (2) it would permit the quiz to be scored quickly, preferably by the examinee, thereby relieving the examiner of this burden; and (3) it would provide the examiner with an immediate item analysis of the questions and answers in order to immediately, i.e., during the same class period, ascertain what subject matter the students had not learned from the prior instruction and which questions, if any, were ill conceived.

In a preferred embodiment of the present invention all of the above-desired objectives are achieved by means of a simple answer sheet which is provided with removable tab portions for answer selection and recording. The answer sheet is preferably affixed as by, for example, a pressure sensitive adhesive over the marginal edge of the preprinted examination paper. The answer sheet is affixed with the removable tabs in registry with preprinted indicia of correct answers placed along the covered margin of the examination paper. Selection and recording of an answer to a question involves lifting and removing one of the tabs to expose the preprinted marginal portion of the examination paper located under the tab. If the selection was correct, the preprinted mark, i.e., back rectangle, on the examination paper will be exposed and the examinee may then go on to the next question. If the selection was wrong this is recorded by exposing irreversibly an unmarked marginal portion of the examination paper. In this case the examinee continues to make selections by removing tabs until he obtains an indication of the correct answer and then he goes on to the next question. When the examinee has completed the quiz he adds up the number of questions he answered incorrectly on his first selection and enters this number on his answer sheet in the score box provided. The examiner collects the answer sheets, preferably ordering them in rank of score, and fans the sheets to expose the marked edges. This fanning gives the examiner an immediate item analysis of the questions and answers. In addition, it permits the examiner to rapidly audit the test score that each examinee has given himself. A quick glance down the column of uncovered answers confirms the sheet score for each examinee. Gross errors are readily discernible as a substantial departure from the regular pattern of exposed marks formed by the rank ordered answer sheets.

The principal object of the present invention is the provision of an improved answer sheet and method of examination whereby an examination may be rapidly scored and the results rapidly analyzed while a class is still in session, if desired.

One feature of the present invention is the provision of an answer sheet which includes as an element thereof a covered premarked portion, such premarking being indicative of the correct answers, and wherein the examinee selects and records his answers to questions by uncovering the preprinted marks, and wherein the examinee's recorded selections are caused to appear on a margin of the answer sheet portion to facilitate audit of the test score and item analysis of the examination.

Another feature of the present invention is an answer sheet according to the preceding feature wherein the examinee uncovers the preprinted marks by lifting removable tab portions of, or removing overprinting, as by erasure, from the answer sheet.

Another feature of the present invention is an answer sheet according to any one or more of the preceding features wherein the answer sheet includes an overlay on the back side of the preprinted portion of the answer sheet to prevent the examinee from ascertaining the preprinted answer marks from the back side of the answer sheet.

Another feature of the present invention is the same as any one or more of the preceding features wherein the plural possible answer selections for one question are arranged in a columnar array above, in the same column, the plural possible answer selections for another question, said columnar array being disposed along an elongated margin of the answer sheet to facilitate item analysis.

Other features and advantages of the present invention will become apparent upon a perusal of the specification taken in connection with the accompanying drawings wherein:

FIG. 1 is a foreshortened plan view of a preferred answer sheet embodiment of the present invention, FIG. 2 is a foreshortened plan view of the answer sheet of FIG. 1 affixed over the margin of a preprinted quiz, FIG. 3 is a sectional view of FIG. 2 taken along lines 3—3 in the direction of the arrows and depicting the answer sheet before it is fastened down to the quiz paper, FIG. 4 is an array of marked answer sheets arranged in order of test score and fanned to expose the marked edges of the answer sheets thereby providing an item analysis of the examination, and FIG. 5 is a foreshortened plan view of an alternative answer sheet embodiment of the present invention.

Referring now to FIG. 1, there is shown a preferred embodiment of the answer sheet of the present invention. The answer sheet comprises an elongated strip of material 1, preferably of a relatively opaque paper. The answer sheet 1 has a printed format on one side. The format preferably includes an information box 2 having a number of labeled blanks at the upper end and to one side of the longitudinal center line 3 of the strip 1. The blanks are to be filled in by the examinee with certain information such as name, date, subject, sheet score and test score. The blank labeled "test score" is preferably disposed adjacent the longitudinal center line 3 of the answer sheet such that the score will be visible when the answer sheets are fanned, as will be more fully described below with regard to the item analysis of the examination results. The center line 3 also forms a foldline for the answer sheet 1 and, to facilitate folding of the sheet, the center line is perforated.

A plurality of slightly spaced apart lift tabs 4 are disposed in a columnar array down one lateral margin of the answer sheet, preferably the left side margin. The tabs 4 extend over from the left margin of the answer sheet to the foldline 3. The tabs 4 are formed by the conventional method of providing a broken perforation around the margin of each tab 4. Triangular shaped extensions 5 of the tabs 4 project out from the margin of the answer sheet to facilitate gripping of the tab 4 for lifting and removal thereof.

Two rows of holes 6 are positioned across the answer sheet 1, one row near the bottom and one row near the top. The rows of holes 6 facilitate fanning of the answer sheets for item analysis as the spacing between holes corresponds to the desired amount of edge overlap. The holes 6 mate with rows of pegs, not shown, on a mounting board. In addition, the positioning of the upper row of holes at a place forming a line of demarcation between the information box 2 and the array of tabs 4 serves as a perforation line to facilitate removal, as by tearing, of the information box portion 2 from the remainder of the answer sheet 1. These information boxes 2, as torn from the answer sheet 1, supply all the needed information for the examiner to enter test results in a grade book or the like without further bother with the remaining bulky portion of the answer sheets, which may be retained in their arrayed form for item analysis of the examination.

An adhesive coating 7 is provided on the back side of the answer sheet 1. Adhesive preferably coats the back side surface of the answer sheet 1 with exception of the back sides of the tabs 4 such that the tabs may be removed from the remainder of the answer sheet 1. A preferred adhesive pattern which permits printing of answer sheets in continuous sheet form is shown in FIG. 1 by the dotted lines 10 and comprises a horizontal uniform striated pattern with the adhesive lines 10 being disposed in registry with the spaces between adjacent tabs 4.

Referring now to FIG. 2, the answer sheet 1 is folded along its foldline 3 over a margin of the quiz sheet 9 which has been premarked along the covered margin with indicia 8 to indicate the correct answers. Preferably the premarked sheet 8 is the sheet containing the test questions. In this manner the indicia 8 of correct answers can be printed on the quiz sheet 9 at the same time that the quiz is printed.

Proper register of the answer sheet 1 with the premarked sheet 9 is obtained by means of two marked holes 6' which are centered over a pair of alignment marks 11 printed on the quiz sheet 9 and placed thereon by a template, not shown, used to position the correct answer marks 8.

The quiz sheet 9 may also be printed with letter groups 12, i.e., *a, b, c, d*, etc., corresponding to possible multiple choice answer selections, such groups being bracketed by printed brackets 13 and identified with each of the questions by an identical identifying number 14 or the like. Also, the answer sheet 1 is preferably preprinted with three sets of repeating letter groupings, 15, 16 and 17, which identify the possible tab selections for True-False, multiple choice, and eight choice questions respectively. The tabs 4 preferably have a vertical spacing on their centers corresponding to the single vertical spacing between rows of letters printed by a standard typewriter. This facilitates obtaining registry between the tabs 4, printed questions, and answer marks 8 of the examination paper 9.

Using the answer sheet 1, an examination is given and the results analyzed according to the following method of the present invention. A master quiz sheet 9 is prepared by typing the questions onto the master sheet in the manner as shown in FIG. 2. A template, not shown, is applied over the right-hand margin of the master sheet and correct answer marks 8 are made through the template onto the margin of the master sheet. The template also preferably provides means to indicate proper registry for marking the master quiz sheet with alignment marks 11, grouping letters 12, brackets 13 and question-identifying numbers 14. The master quiz sheet is so marked using the template. The required number of quiz sheets 9 are then printed from the master sheet.

One answer sheet 1 is then folded over the right margin of each of the quiz sheets 9 and permanently affixed in registry with the alignment marks 11 such as to completely cover over the correct answer marks 8. The quiz sheets are then handed out to the examinees for answer. The examinee selects the tab 4 which he believes to be the correct answer and removes the tab 4 to expose the right margin of the quiz sheet 9. If his answer selection was correct, he exposes a mark 8 and goes on to the next question. If his selection exposes an unmarked margin of the test sheet 9, he makes another selection and so on until he makes the correct selection and then goes on to the next question.

When the examinee has answered all of the questions he fills out the score box blanks 2, entering his test and sheet scores in the designated blanks. His scores are determined, for example, by the number of questions he answered incorrectly on his first selection. The examinee then marks on the quiz sheet 9 the correct answer to all the questions, such that he may retain the questions and correct answers for his further benefit. He then tears off the right marginal strip of the quiz sheet containing only the answer sheet 1 and turns it in to the examiner.

The examiner orders the answer sheets 1 in rank order of test score and fans the answer sheets to expose the marked edges of the answer sheets, as indicated in FIG. 4. For a more precise and permanent arraying, the answer sheets are placed on a pegboard, not shown, with pegs pushed through the rows of holes 6 and with each succeeding answer sheet 1 placed upon the board being offset to the left by one hole spacing. The top sheet of the fanned array of answer sheets is preferably made the quiz master sheet such that the questions and answers are readily correlated.

The fanned array of answer sheets 1 forms an item analysis of the examination. For example, referring to FIG. 4, assume that the selections were made on the individual answer sheets 1, as shown. Note that the answer sheet 1 has a color which is contrasting with the paper and printing colors of the quiz sheet, which quiz paper color is typically white and the printing on the quiz sheet is typically black or purple, for spirit copies. Thus a suitable answer sheet color is brown or orange, as indicated by the cross-hatching. Thus the cross-hatching indicates no selection of that possible answer while correct answers appear as a strip of black and the incorrect answer selections appear as white squares or indicia.

Thus, in the array of FIG. 4, question 20 appears to be poorly conceived since all examinees missed this question with the exception of the lowest scorer and it was the only question incorrectly answered by the highest scorer. On the other hand, question 19 was too easy since all examinees correctly answered this question on the first attempt.

The item analysis requires no further effort on the part of the examiner than mere perusal of the fanned and ranked answer sheets. Use of the answer sheet 1 of the present invention allows the test results to be analyzed almost immediately after the last answer sheet has been returned. Thus the examiner can, during the same class period, ascertain which questions were most often missed and which answer was most often evoked to any given question.

Also, the fanned answer sheets of FIG. 4 readily permit an easy audit by the examiner of the scores each examinee has given himself. In addition, the examinee learns the correct answers to the questions during the examination.

Locating the answer sheet 1 on the right margin of the quiz sheet 9 permits the quiz sheet, with correct answers transferred by the examinee, to be retained by the examinee for future reference. Conventional three-hole notebook paper may be used for the quiz sheet 9 such that the retained quiz sheet may be inserted in the customary three-hole binder.

Referring now to FIG. 5, there is shown an alternative embodiment of the present invention. In this embodiment the answer sheet is printed onto the quiz sheet 9. More specifically, the quiz sheet 9 is prepared and printed as previously described except that the information box 2 is printed onto the quiz sheet 9 and the back side of the marked margin of the quiz sheet is also overprinted with an opaque substance. The printing ink used on the quiz sheet 9 is preferably difficult to erase. Then a cover layer 21 of easily erasible opaque ink or other suitable erasible cover material, such as flat black spray paint over a rubber cement coat, is printed or otherwise applied over the correct answer marks 8 previously printed along the margin of the quiz sheet 9. The examinee makes his answer selection by erasing the cover layer 21 from the designated region to uncover the presence or absence of a correct answer mark 8. The answer sheet portion may be torn or otherwise removed from the quiz sheet 9 and used as before for an item analysis. A row of preprinted circles 22 facilitates placement on the peg board, not shown.

Since many changes can be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An answer sheet including, means forming a columnar array of correct and incorrect answer indicia for separate questions in a set of quiz questions, said incorrect indicia means being disposed along the margin of the answer sheet, means forming an opaque overlay contrasting with said incorrect answer indicia means covering over said correct and incorrect answer indicia means and forming a composite with said answer sheet, said overlay means being disposed coextensively along the margin of said answer sheet, and portions of said overlay means, corresponding to each answer choice, being selectively removable to make an answer selection thereby recording the selection to each answer choice by exposing a change on the margin of the composite answer sheet, whereby the examinee learns the correct answer from the answer sheet and whereby the answer sheets may be used for item analysis of the quiz by fanning their selectively exposed margin portions in overlapping relationship.

2. The answer sheet according to claim 1 wherein said selectively removable overlay means comprises a column of removable tabs.

3. The answer sheet according to claim 1 wherein said selectively removable overlay means comprises an opaque erasible coating.

4. The answer sheet according to claim 1 wherein said correct answer indicia means comprises printed marks on the margin of a sheet of material, and said opaque overlay means overlays both the front and back side of the marginal sides of the sheet containing said printed marks whereby compromise of the marks is made more difficult.

5. The answer sheet according to claim 4 wherein said overlay means comprises a foldable sheet of material adapted to be folded along a longitudinal fold line over the marked marginal edge of the answer sheet.

6. An answer sheet overlay for a quiz sheet of the type having a column of correct answer indicia placed along the marginal edge of the quiz sheet comprising an answer overlay sheet of material for fastening over the correct answer indicia on the marginal edge of the quiz sheet, said overlay sheet of material having a column of separately removable elongated tabs extending to one margin of said overlay sheet as applied to the quiz sheet and corresponding to different possible answer selections, and an adhesive coating provided on the back side of said overlay sheet for holding said overlay sheet to the quiz sheet.

7. The overlay according to claim 6 wherein said overlay sheet includes a longitudinal fold line for folding said overlay sheet over the marginal edge of the quiz sheet, and wherein said tabs extend from one margin of said overlay sheet to said foldline.

8. The overlay according to claim 7 wherein overlay sheet includes a pair of rows of perforations extending transversely across said overlay sheet with one of said rows located near one end of said overlay sheet and the other row located near the other end of said overlay sheet for receiving pegs of a pegboard to facilitate fanning of the completed answer sheets.

References Cited by the Examiner

UNITED STATES PATENTS

| 2,137,447 | 11/1938 | Ellis | 35—48.1 |
| 2,305,972 | 12/1942 | Lorber | 35—48.1 |
| 3,040,472 | 6/1962 | Miller | 283—6 X |
| 3,055,117 | 9/1962 | Bernstein et al. | 283—6 X |

EUGENE R. CAPOZIO, *Primary Examiner.*

JEROME SCHNALL, *Examiner.*

SHELDON M. BENDER, *Assistant Examiner.*